(12) United States Patent
Fritsche

(10) Patent No.: US 7,681,476 B2
(45) Date of Patent: Mar. 23, 2010

(54) FIBER OPTIC CABLE STRIPPER

(75) Inventor: Peter D. Fritsche, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/888,649

(22) Filed: Jul. 31, 2007

(65) Prior Publication Data

US 2009/0031864 A1 Feb. 5, 2009

(51) Int. Cl.
*H02G 1/12* (2006.01)
(52) U.S. Cl. .......................... 81/9.51; 30/90.4
(58) Field of Classification Search ................. 81/9.51, 81/9.4–9.44; 30/90.4
See application file for complete search history.

(56) References Cited

U.S. PATENT DOCUMENTS

| | | | |
|---|---|---|---|
| 3,182,532 A | 5/1965 | Oehlerking | |
| 4,059,892 A | 11/1977 | Siden | |
| 4,283,971 A * | 8/1981 | Hetmanski | 81/9.51 |
| 4,584,912 A | 4/1986 | Gudmestad et al. | |
| 4,601,093 A | 7/1986 | Cope | |
| 4,619,164 A | 10/1986 | Aikens | |
| 4,745,828 A | 5/1988 | Stepan | |
| 4,784,024 A * | 11/1988 | Butler | 81/9.51 |
| 4,815,207 A * | 3/1989 | Schwartzman | 81/9.51 |
| 4,932,299 A | 6/1990 | Haines et al. | |
| 4,969,703 A | 11/1990 | Fyfe et al. | |
| 4,993,147 A | 2/1991 | Carpenter et al. | |
| 5,003,846 A | 4/1991 | Yagawa et al. | |
| 5,010,797 A | 4/1991 | Stepan | |
| 5,016,500 A | 5/1991 | Conrad et al. | |
| 5,172,620 A | 12/1992 | Faust | |
| 5,269,206 A | 12/1993 | Yagawa | |
| 5,295,421 A | 3/1994 | Mansfield | |
| 5,320,002 A | 6/1994 | Sayyadi et al. | |

(Continued)

FOREIGN PATENT DOCUMENTS

DE 203 01 693 U1 1/2003

(Continued)

OTHER PUBLICATIONS

International Search Report and Written Opinion mailed Dec. 19, 2008.

(Continued)

*Primary Examiner*—Hadi Shakeri
(74) *Attorney, Agent, or Firm*—Merchant & Gould P.C.

(57) ABSTRACT

Replaceable structures for use with a fiber stripping device are disclosed. The structures include a blade including an edge with a semi-circular notch having a diameter of about 0.0096 inches for stripping a tight-buffer cable including fiber with a 125 μm diameter and a surrounding coating with a 250 μm diameter, the buffer of 900 μm bonded to the coating. A centering structure aligns the cable horizontally and vertically with respect to a pair of blades. The centering structure includes a body with an offset protruding portion defining a top contact surface acting as a vertical stop for the cable. An elongate groove at a second end of the body extends from the second end toward the first end and includes an open end toward the second end and a closed end toward the first end, a portion of the groove formed by the top contact surface.

9 Claims, 13 Drawing Sheets

U.S. PATENT DOCUMENTS

| | | | |
|---|---|---|---|
| 5,351,580 A | 10/1994 | Potesta et al. | |
| 5,398,573 A | 3/1995 | Wollermann | |
| 5,438,753 A | 8/1995 | Stepan | |
| 5,445,051 A | 8/1995 | Carpenter et al. | |
| 5,517,881 A | 5/1996 | Burns | |
| 5,561,899 A | 10/1996 | Carpenter et al. | |
| 5,582,078 A | 12/1996 | Talley | |
| 5,669,276 A | 9/1997 | Spacek | |
| 5,787,768 A | 8/1998 | Talley | |
| 6,023,844 A | 2/2000 | Hinson, II et al. | |
| 6,176,155 B1 | 1/2001 | Palmowski et al. | |
| 6,237,743 B1 | 5/2001 | Bracher | |
| 6,286,393 B1 | 9/2001 | Messer et al. | |
| 6,321,621 B1 * | 11/2001 | Stepan | 81/9.51 |
| 6,360,430 B1 | 3/2002 | Stepan | |
| 6,561,061 B1 | 5/2003 | Stepan | |
| 6,718,624 B1 | 4/2004 | Rohrbach et al. | |
| 6,910,256 B2 | 6/2005 | Locher et al. | |
| 6,983,534 B2 | 1/2006 | Zeibig et al. | |
| 7,152,513 B2 * | 12/2006 | Palmowski | 81/9.51 |

FOREIGN PATENT DOCUMENTS

| | | |
|---|---|---|
| EP | 0 710 858 A1 | 5/1996 |
| EP | 1 037 077 A2 | 9/2000 |
| EP | 1 070 374 B1 | 3/2002 |
| EP | 1 413 903 A1 | 4/2004 |
| JP | 11 084138 A | 3/1999 |
| WO | WO 89/02796 | 4/1989 |
| WO | WO 98/33082 | 7/1998 |

OTHER PUBLICATIONS

Schleuniger®, FiberStrip 7030/7035—Stripping Machines, Undated, 4 Pages.

* cited by examiner

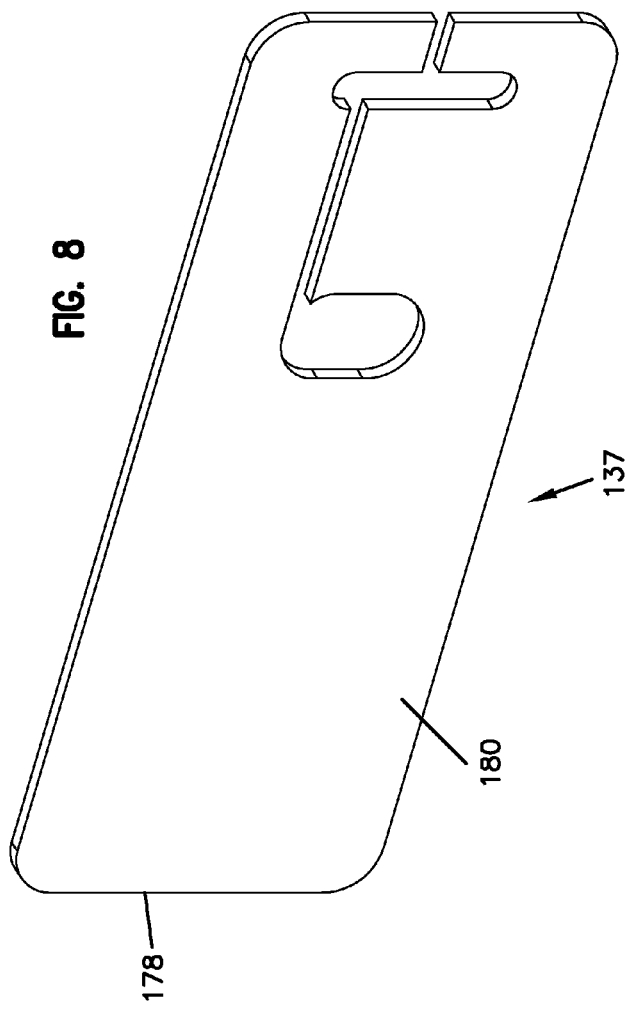
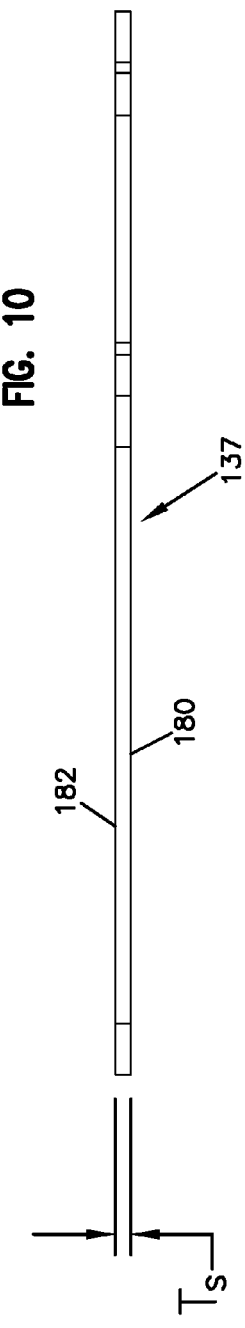
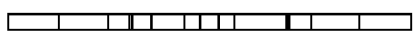

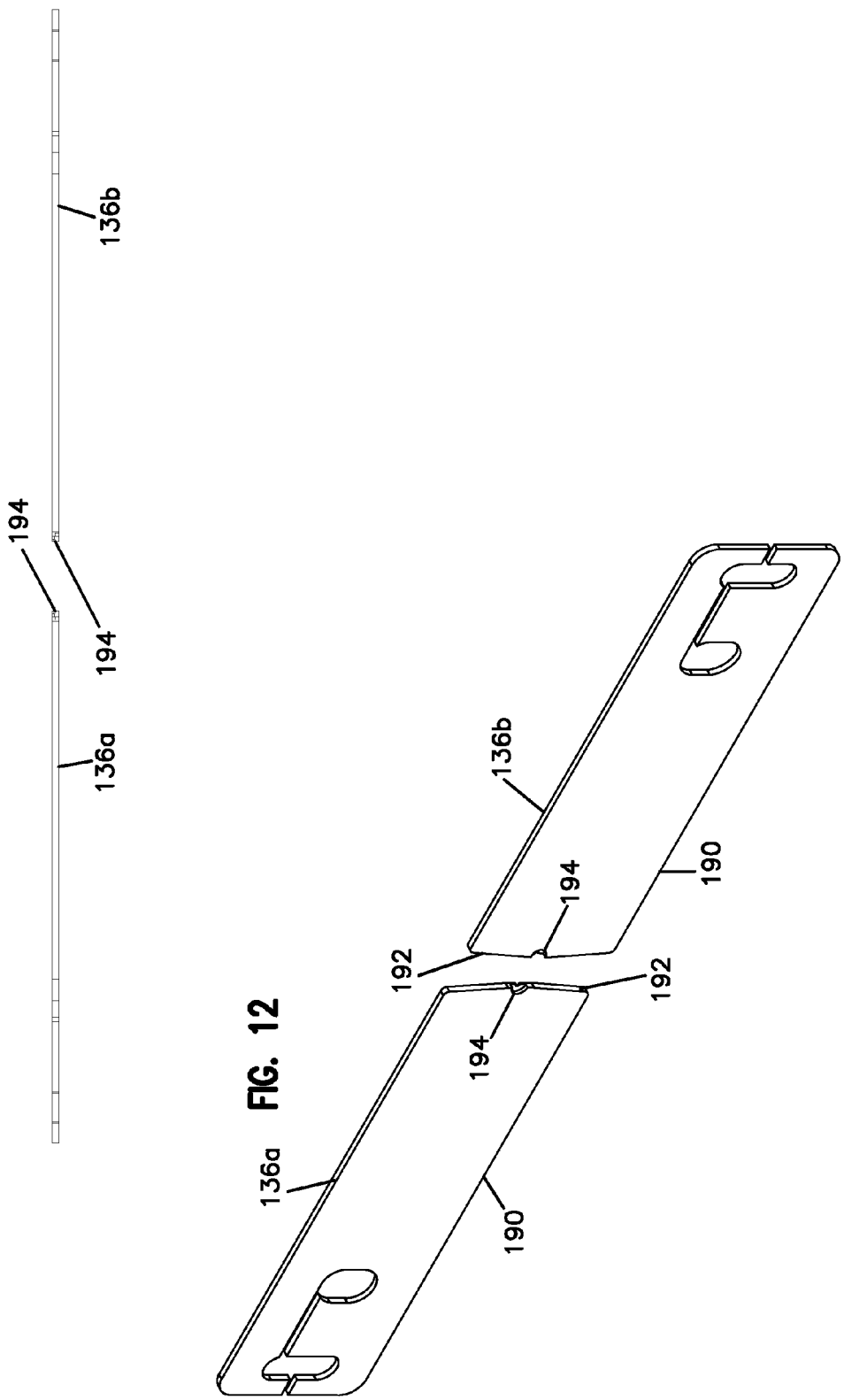

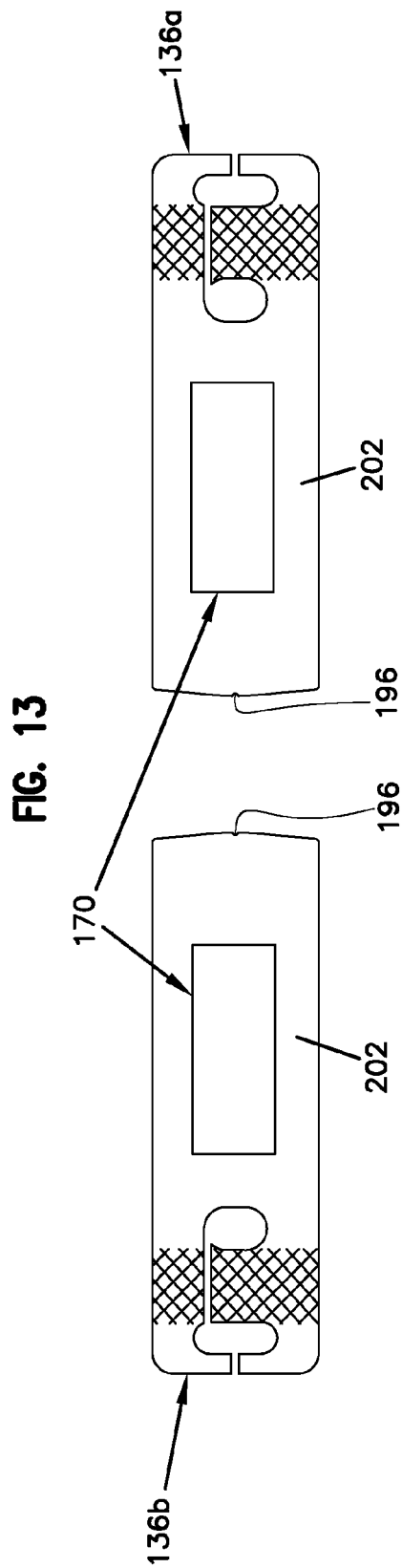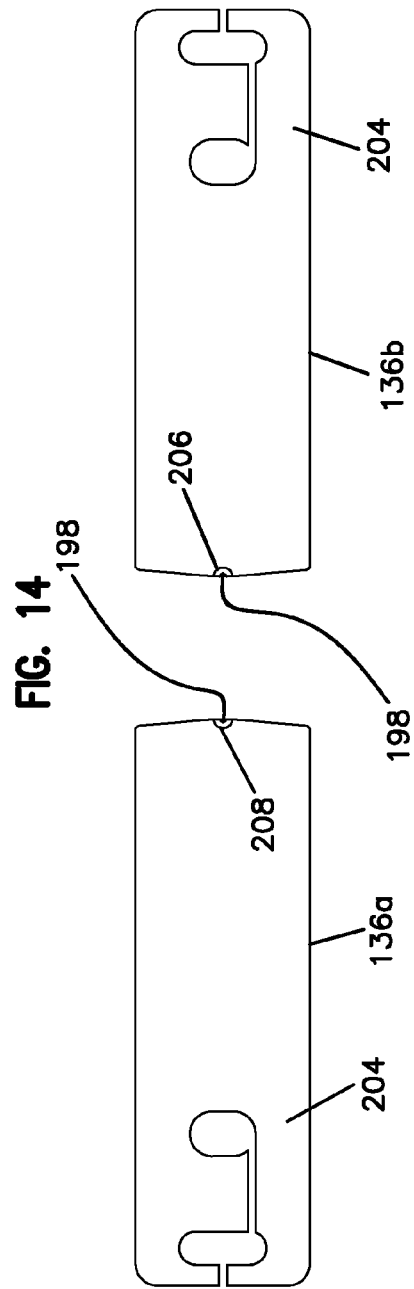

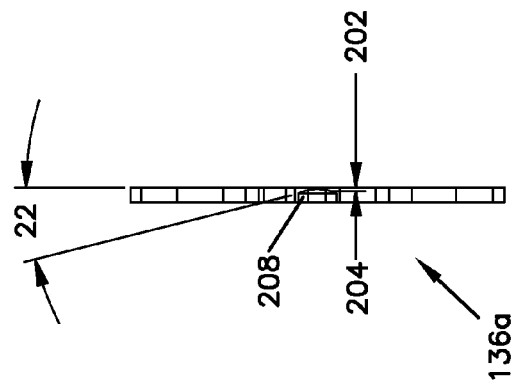
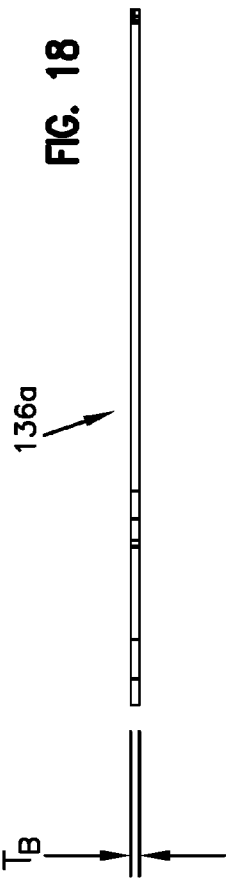
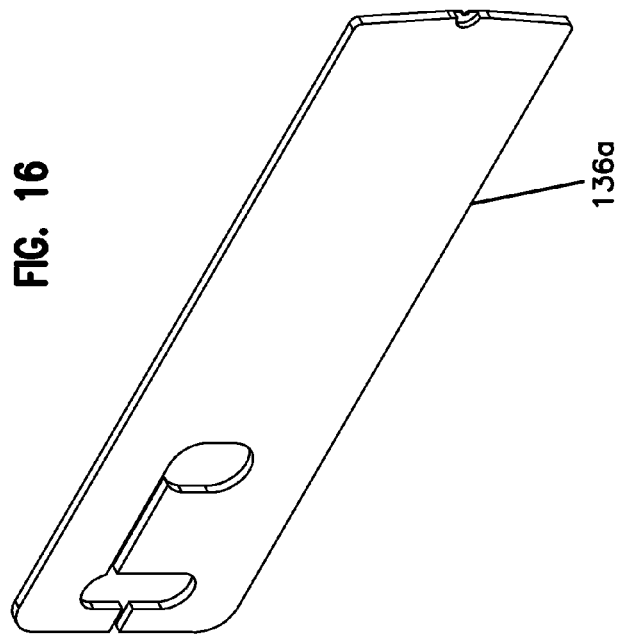

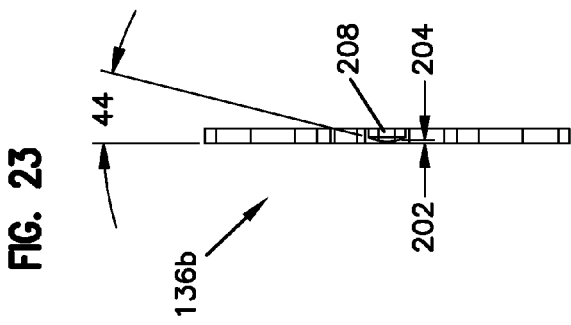
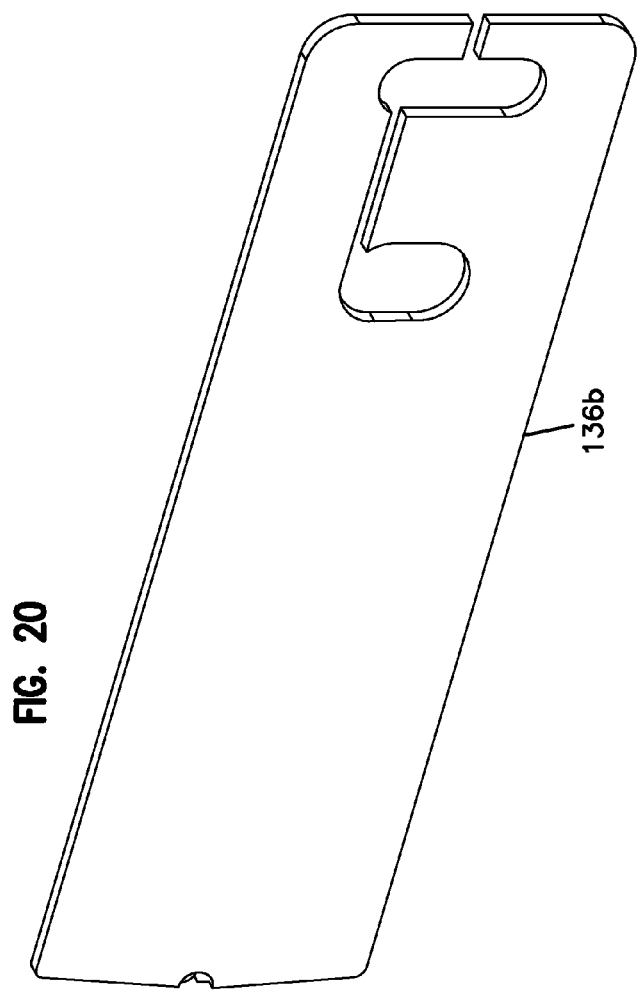
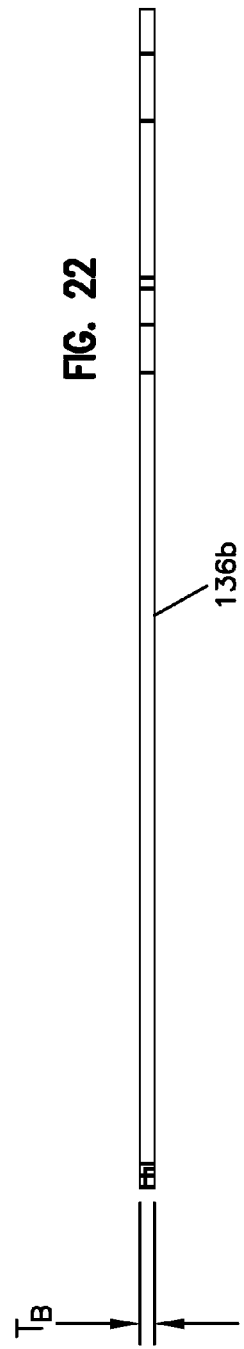

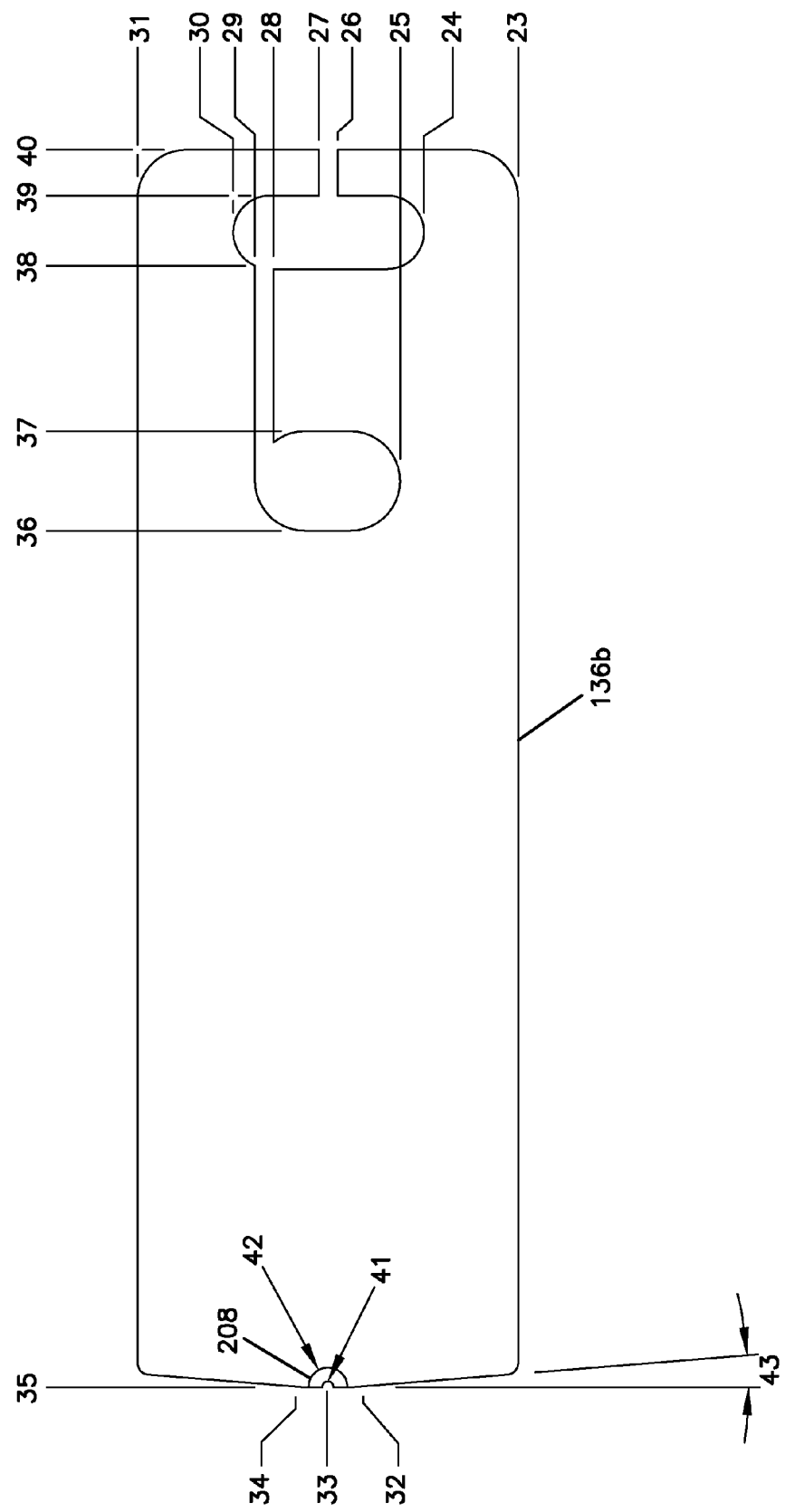

FIBER OPTIC CABLE STRIPPER

FIELD

This invention pertains to the telecommunications industry. More particularly, this invention pertains to devices for stripping fiber optic cables and replaceable parts for such devices.

BACKGROUND

There are a variety of prior art devices for stripping fiber optic cables. One type of device utilizes a pair of stripping blades that come together to strip the buffer or coating off of the fiber. The desired effect is for the stripping blades to not come in contact with the fiber and to remove the buffer or the coating with as little damage to the fiber as possible. Any contact between the blades and the fiber or rubbing of the buffer or the coating against the fiber during stripping may damage the fiber. Any damage to the fiber tends to reduce its strength and may cause breaking of the fiber. Testing of the fibers has indicated that the weakest point of a fiber, where a fiber normally tends to break, is either: 1) in a ferrule chamfer where stress is the highest or 2) at where stripping blades have first made contact with the fiber during stripping of the cable.

Because of the Fiber to the Home (FTTH) initiative, fiber, nowadays, must endure outside environments, where undamaged or strong fiber provides a significant advantage. If a fiber breaks during when the fiber is in service, it may cause service outage for the end user. This is a major concern among fiber customers.

Improved devices for stripping fiber optic cables are desired.

SUMMARY

The present disclosure relates to improved stripping blade configurations for use with fiber optic cable stripping devices and also alignment structures used with the devices for correctly positioning the fiber optic cable with respect to the stripping blade surfaces.

According to one inventive aspect, a stripping blade for stripping the buffer off of an optical fiber includes a body including at least one mounting hole for mounting the stripping blade to a fiber optic stripping device, wherein the body defines an edge with a generally semi-circular stripping notch, wherein the notch has a circle diameter of about 0.0096 inches, wherein the stripping blade is configured for stripping a tight-buffer fiber optic cable having a total buffer and optical fiber diameter of about 900 µm, wherein the optical fiber has a diameter of about 125 µm and includes a coating having a diameter of about 250 µm surrounding the optical fiber, wherein the buffer is bonded to the coating of the optical fiber According to another inventive aspect, a centering structure for aligning a fiber optic cable horizontally and vertically with respect to a pair of stripping blades of a fiber optic cable stripping device coming together to strip a layer surrounding an optical fiber includes a generally rectangular body with a first end and a second end, the body including at least one mounting hole for mounting the centering structure to the fiber optic cable stripping device, the second end of the body including a tongue protruding outwardly in an offset configuration with respect to a rest of the second end, wherein the tongue defines a top contact surface for providing a vertical stop for a fiber optic cable laid on the top contact surface. An elongate groove is formed at the second end of the body, the groove extending in a direction generally from the second end toward the first end, the groove including an open end facing toward the second end of the body and a closed end facing toward the first end of the body, at least a portion of the groove formed by the top contact surface of the tongue.

Methods for using the stripping blade and the centering structure are also disclosed.

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows:

FIG. 6 is a top view of the centering structure of FIG. 4;

FIG. 7 is a side view of the centering structure of FIG. 4;

FIG. 8 is a perspective view of a spacer, the spacer having features that are examples of inventive aspects in accordance with the principles of the present disclosure;

FIG. 10 is a top view of the spacer of FIG. 8;

FIG. 11 is a side view of the spacer of FIG. 8;

FIG. 12 is a perspective view of a pair of stripping blades configured for use with the device of FIG. 1, the pair of stripping blades having features that are examples of inventive aspects in accordance with the principles of the present disclosure;

FIG. 13 is a front view of the pair of stripping blades of FIG. 12;

FIG. 14 is a rear view of the pair of stripping blades of FIG. 12;

FIG. 15 is a top view of the pair of stripping blades of FIG. 12;

FIG. 16 is a perspective view of the right stripping blade of the pair of blades shown in FIGS. 12-15;

FIG. 18 is a top view of the right stripping blade of FIG. 16;

FIG. 19 is a side view of the right stripping blade of FIG. 16;

FIG. 20 is a perspective view of the left stripping blade of the pair of blades shown in FIGS. 12-15;

FIG. 21 is a front view of the left stripping blade of FIG. 20;

FIG. 22 is a top view of the left stripping blade of FIG. 20; and

FIG. 23 is a side view of the left stripping blade of FIG. 20.

DETAILED DESCRIPTION

Reference will now be made in detail to the exemplary aspects of the present inventive features that are illustrated in the accompanying drawings. Wherever possible, the same reference numbers will be used throughout the drawings to refer to the same or like parts.

Figure 1:
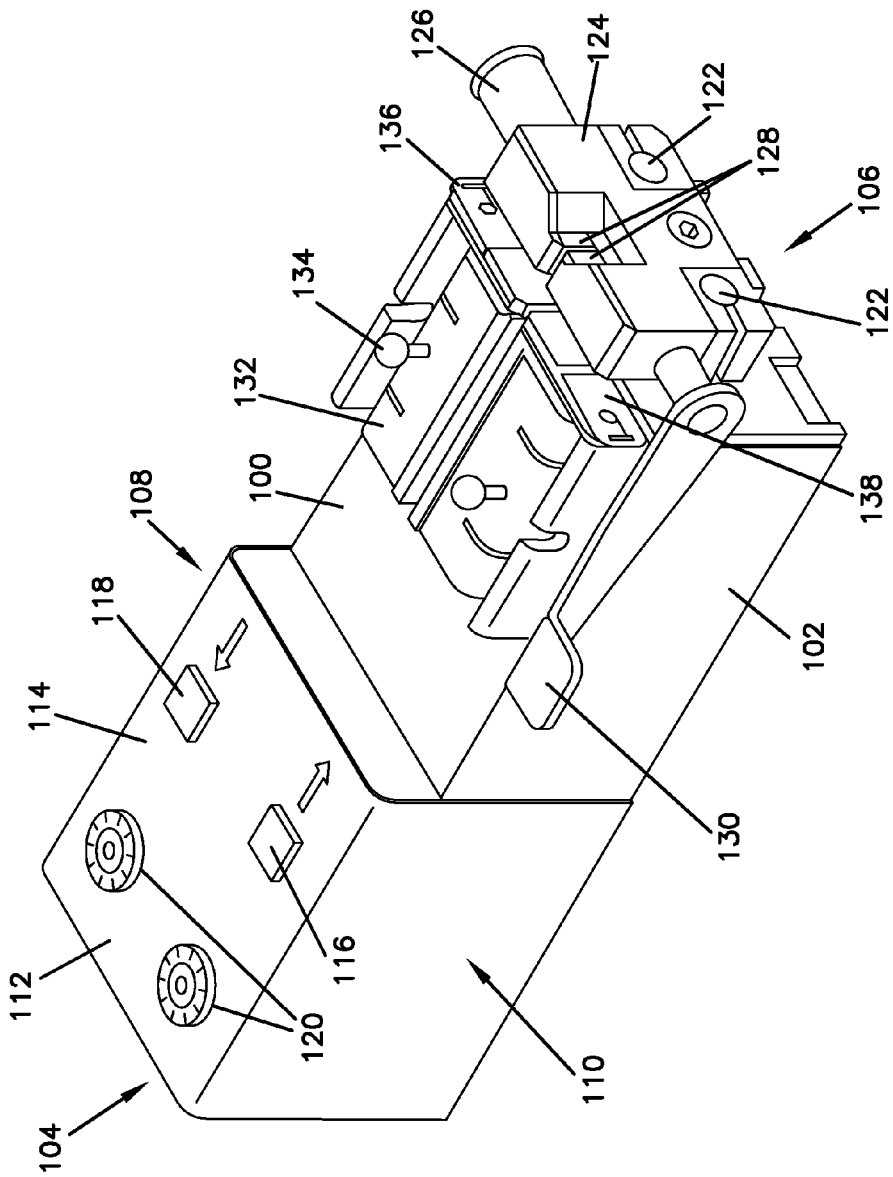
FIG. 1 is a perspective view of a fiber optic cable stripping device that includes stripping blades having features that are examples of inventive aspects in accordance with the principles of the present disclosure and that includes a centering structure for correctly positioning a fiber optic cable with respect to the stripping blade surfaces, the centering structure having features that are examples of inventive aspects in accordance with the principles of the present disclosure.

FIG. 1 illustrates a fiber optic cable stripping device 100 that is configured to remove one or more protective layers (e.g., coating, buffer, etc.) from an optical fiber to expose the fiber. A fiber optic cable stripping device similar to the device 100 illustrated in FIG. 1 is available from Schleuniger AG under the model name "Fiber Strip 7030" and is described in detail in U.S. Pat. No. 6,321,621, the entire disclosure of which is incorporated herein by reference.

Still referring to FIG. 1, the device 100 includes a main body 102 defining a first end 104, a second end 106, a right side 108 and a left side 110. At the first end 104 of the body 102 is located a control housing 112 that houses control electronics for operation of the device 100. At a top surface 114 of the control housing 112 are located activation and return buttons 116, 118 for stripping the fiber optic cable and returning the device 100 to the original starting position, respectively. The device 100 is configured to apply heat on the layers surrounding the optical fiber for facilitating the stripping process. Control dials 120 for setting the heating time and temperature of the device 100 are also located on the top surface 114 of the control housing 112.

The main body 102 comprises an internal frame which supports a pair of connecting rods 122. At the second end 106 of the main body 102, at the front end of the connecting rods 122, is mounted a clamping structure 124 for clamping the fiber optic cable to be stripped. When the device 100 is activated, the clamping structure 124 is moved by the connecting rods 122 in a direction extending away from the control housing 112 for stripping the fiber optic cable. A collar 126 is used for adjusting the clamping force of the clamping jaws 128 which are held by spring force in a closed position. When the fiber optic cable is ready to be inserted between the clamping jaws 128, the clamping jaws 128 are opened by a release lever 130.

In operation, the length of fiber optic cable to be stripped is laid between a pair of heating jaws 132 located adjacent the second end 106 of the body 102. Heating jaws 132 are pivotally disposed on the device 100 and include control handles 134 for bringing the heating jaws 132 into position. The heating jaws 132 are configured to apply heat to the length of fiber optic cable to be stripped as the clamping structure 124 pulls the stripped optical fiber away from the heating jaws 132.

The stripping of the fiber optic cable is performed by a pair of stripping blades 136 located between the clamping structure 124 and the heating jaws 132. In order to vertically and horizontally align the fiber optic cable and center it with respect to the cutting surface of the stripping blades 136 such that the fibers therein are not damaged during the stripping process, a centering structure 138 is also provided adjacent the stripping blades 136. Both the stripping blades 136 and the centering structure 138 are removably mounted to the device 100 and configured to be replaceable parts.

It should be noted that various types of stripping blades 136 and centering structures 138 can be used with the device of FIG. 1, depending upon the type of fiber optic cable that is being stripped. A number of different stripping blades 136 and centering structures 138 having features that are examples of inventive aspects in accordance with the principles of the present disclosure will be discussed in detail below.

Since the stripping blades 136 and/or the centering structures 138 of the device 100 may wear out due to repetitive use and since different types of stripping blades 136 and/or centering structures 138 may be used for different types of fiber optic cable, the device 100 is configured to provide for ways to replace/change the stripping blades 136 and/or the centering structures 138.

Figure 2:
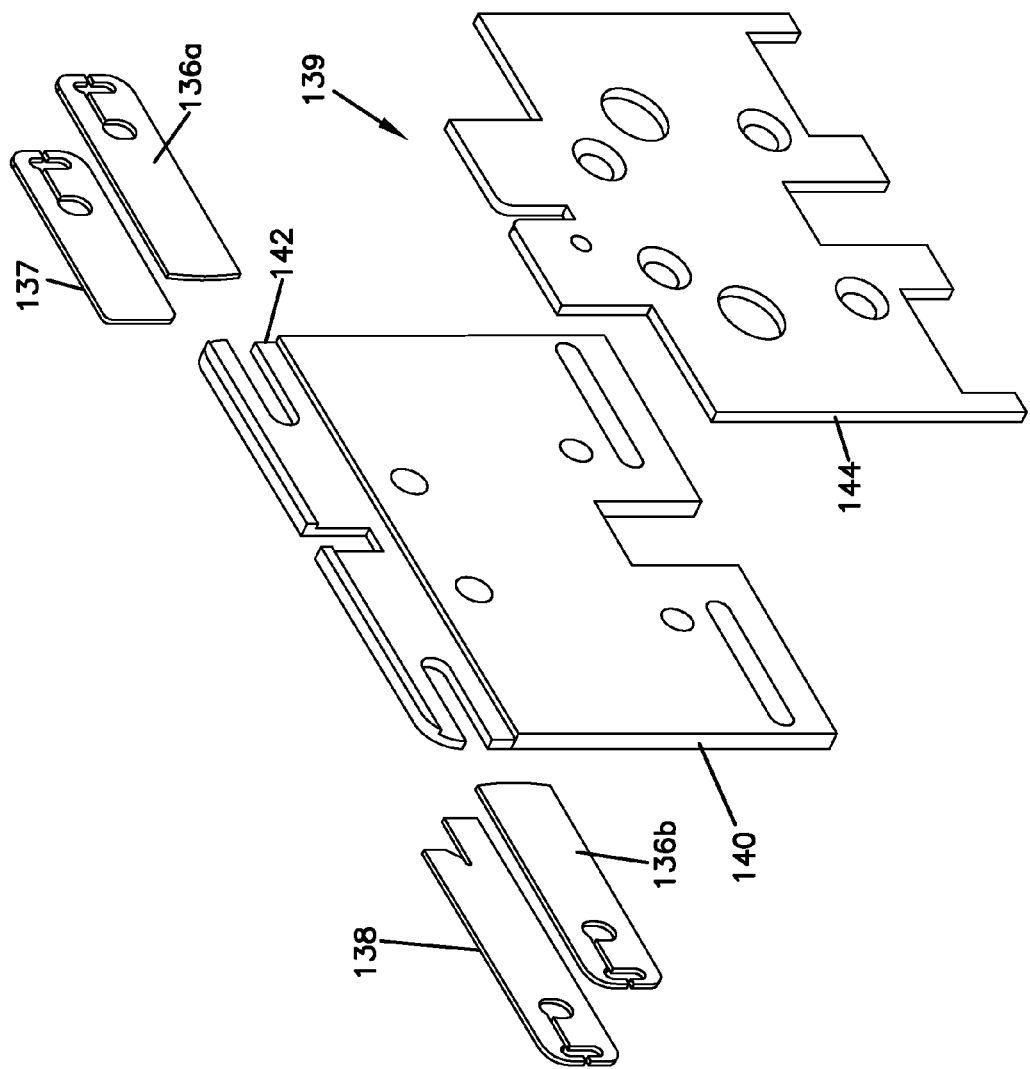
FIG. 2 is an exploded perspective view of the attachment fixture of the fiber optic stripping device of FIG. 1, the fixture configured for attaching and detaching the stripping blades and the centering structure to and from the device.
Figure 3:
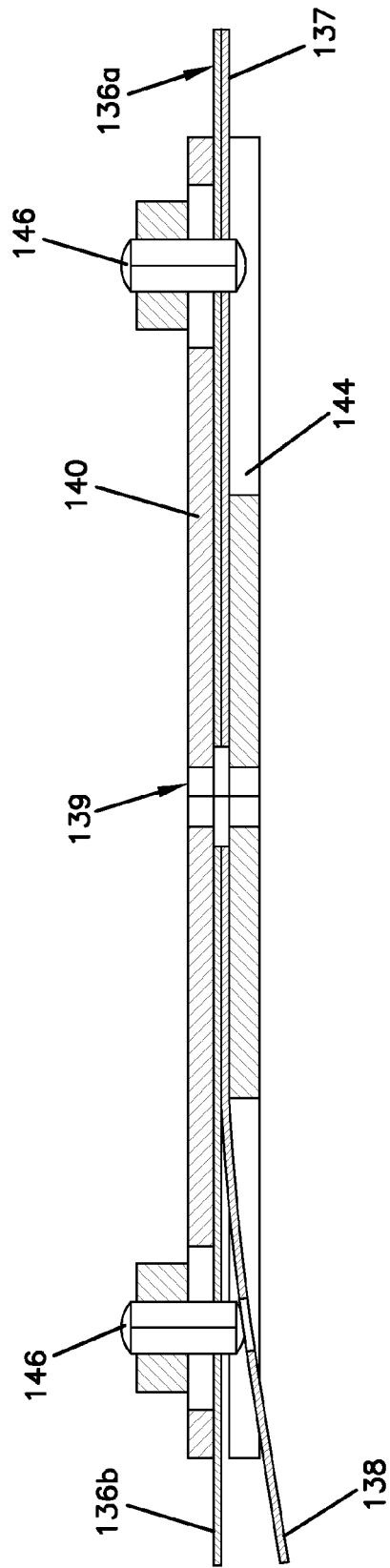
FIG. 3 is a top, cross-sectional view of the stripping blades and the centering structure of FIG. 2 showing the attachment method thereof.
Figure 4:
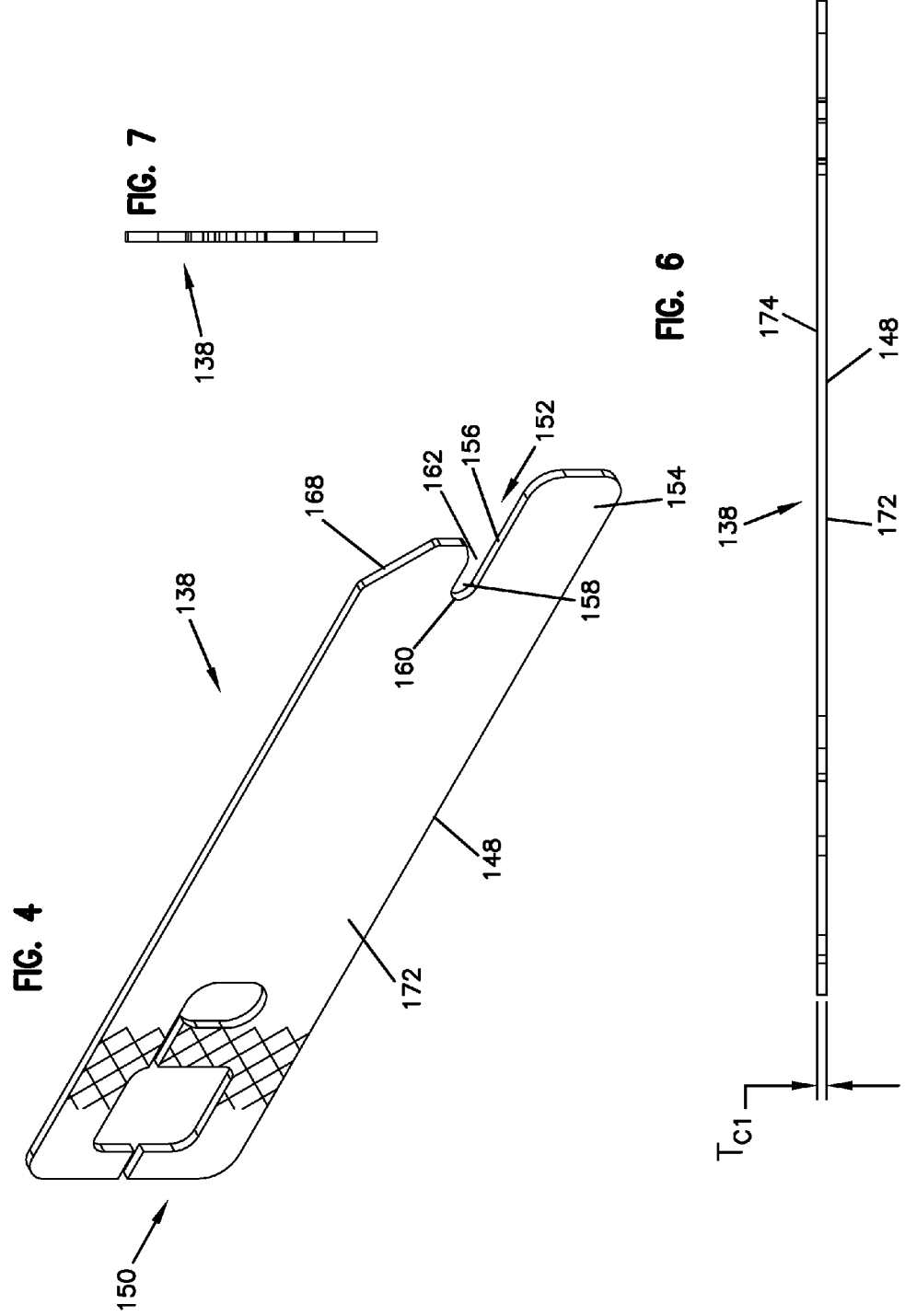
FIG. 4 is a perspective view of a centering structure configured for use with the device of FIG. 1, the centering structure having features that are examples of inventive aspects in accordance with the principles of the present disclosure.
Figure 5:
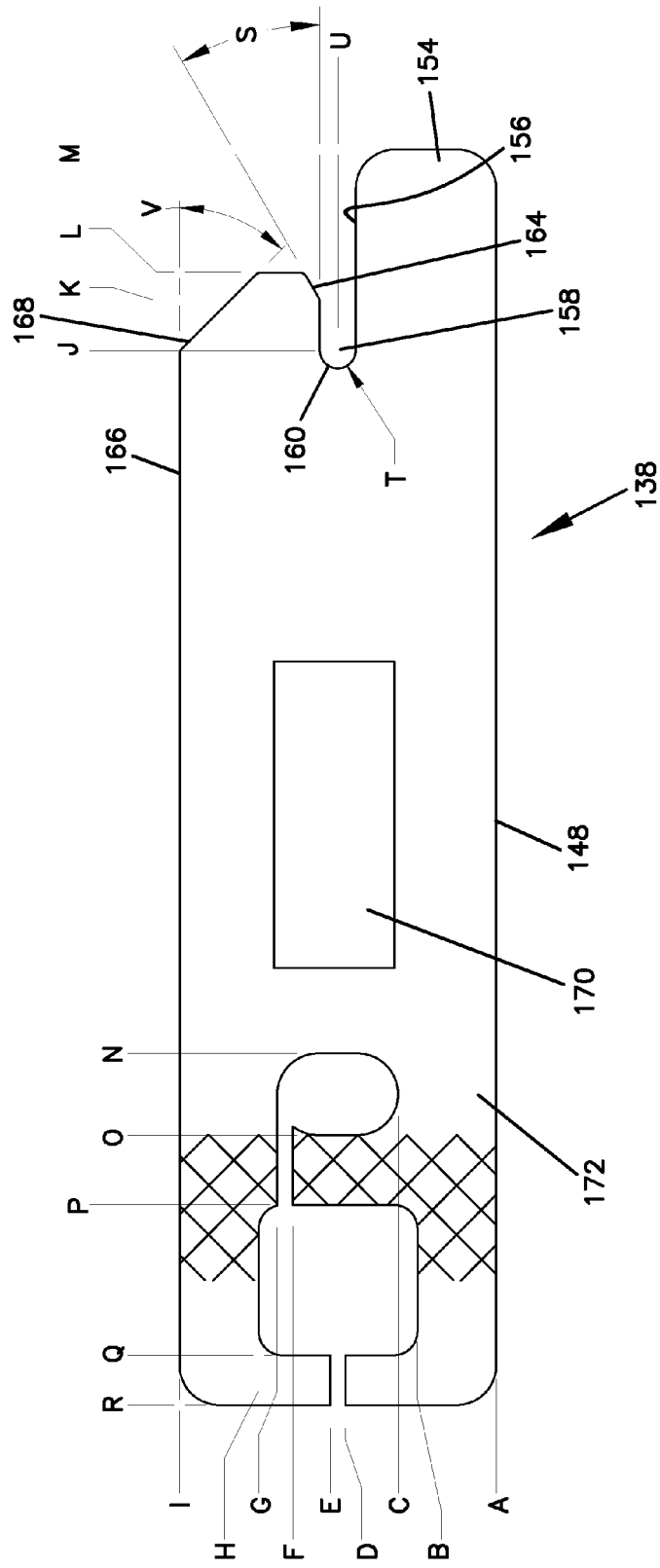
FIG. 5 is a front view of the centering structure of FIG. 4.
Figure 9:
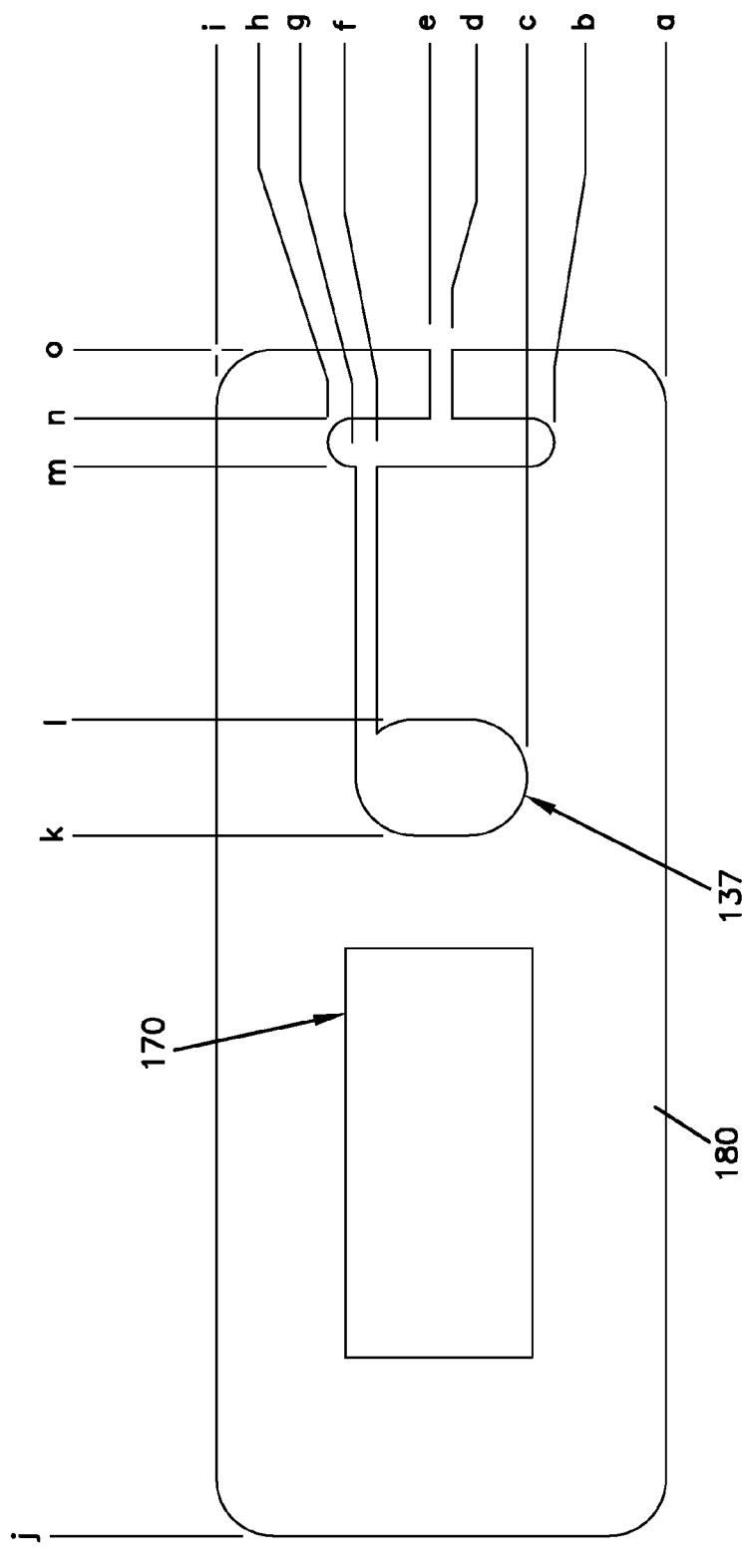
FIG. 9 is a front view of the spacer of FIG. 8.
Figure 17:
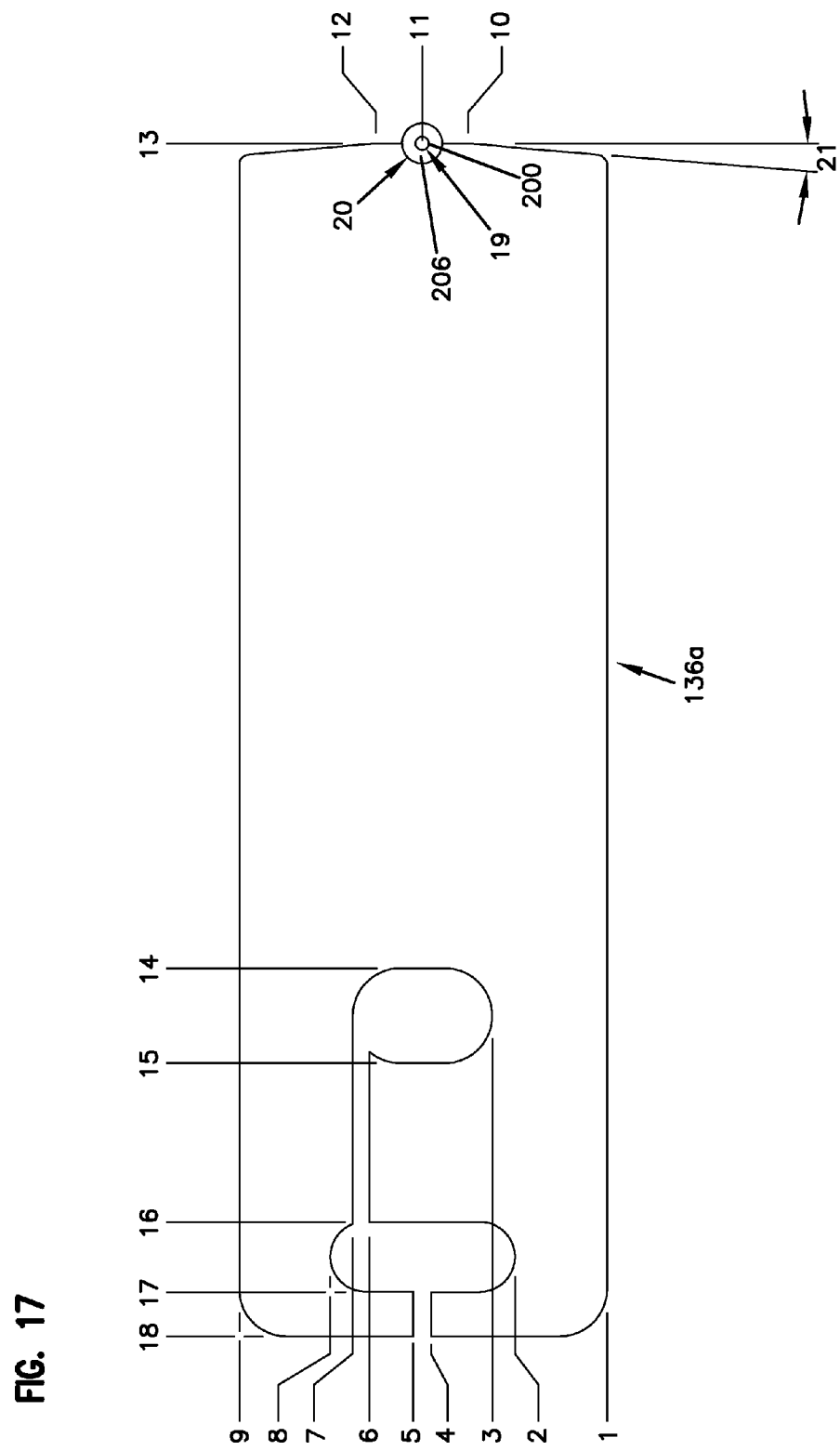
FIG. 17 is a front view of the right stripping blade of FIG. 16.

FIGS. 2 and 3 illustrate the attachment fixture 139 and the attachment/detachment of the stripping blades 136 and the centering structure 138 to and from the device 100. A fixed guide plate 140 having a guide groove 142 is covered by a cover plate 144. As shown in FIG. 1, the guide plate 140 and the cover plate 144 are mounted at the second end 106 of the body 102 of the device 100. The combination of the fixed guide plate 140 and the cover plate 144 forms an insertion guide for the stripping blades 136 and the centering structure 138. As shown in the cross-sectional view in FIG. 3, spring properties of the stripping blades 136 and the centering structure 138 enable them to snap in and snap out by a spring action. By slightly bending the stripping blades 136 and the centering structure 138, they can be locked and released on pins 146 of the device 100, without the need for other tools. The stripping blades 136 and the centering structures 138 may be made out of various metals and other materials.

For further details of the configuration and the operation of the device 100 of FIGS. 1-3, please refer to U.S. Pat. No. 6,321,621, the entire disclosure of which has been incorporated herein by reference.

FIGS. 4-7 illustrate an embodiment of the centering structure 138 configured for use with the device 100 of FIG. 1, the centering structure 138 having features that are examples of inventive aspects in accordance with the principles of the present disclosure. The centering structure 138 of FIGS. 4-7 is configured to be placed at the left side of the attachment fixture 139 (see FIG. 2). FIGS. 8-11 illustrate a spacer 137 that is configured to be placed on the right side of the attachment fixture 139 (see FIG. 2) to provide the appropriate spacing for the right stripping blade. As will be discussed below, the centering structure 138 is configured to provide for vertical and horizontal alignment of the fiber optic cable with respect to the stripping blades 136 such that the fiber optic cable can be stripped without damage to the fiber.

Still referring to FIGS. 4-7, the centering structure 138 generally includes a rectangular plate 148 extending between a first end 150 and a second end 152. At the second end 152 of the plate 148 is a tongue portion 154 that protrudes outwardly from the rest of the second end 152. The tongue portion 154 defines a top edge 156 where the fiber optic cable buffer is configured to rest. The top edge 156 provides a vertical stop for the buffer of the fiber optic cable for the stripping operation. Adjacent the second end 152, the plate 148 defines an elongate groove 158 with a circular closed end 160. The groove 158 has an open end 162 defining a tapering-out portion 164. During the stripping operation, when a pair of stripping blades 136 come together to capture the fiber optic cable between their stripping surfaces, the right blade 136a will tend to contact the buffer of the fiber optic cable and push it into the elongate groove 158, wherein the fiber optic cable is horizontally aligned perfectly with the stripping surfaces of the blades 136 for the stripping operation. The tapered portion 164 assists entry of the fiber into the groove 158 as the stripping blades 136 come together.

Adjacent the second end 152 of the plate 148, the top end 166 of the plate 148 includes a downwardly angled portion 168. This angled portion 168 may assist in initially laying fiber optic cable onto the top edge 156 defined by the tongue 154.

Indicia 170 may be provided on the front face 172 of the centering structure 138. The centering structure 138 should be inserted into the device 100 of FIG. 1 such that the indicia 170 faces toward the clamping structure 124 of the device 100. In one embodiment, the centering structure 138 has a thickness $T_{C1}$ of about 0.012 inches extending from the front face 172 to the rear face 174 (see FIG. 6).

FIGS. 8-11 illustrate the spacer 137 that is designed to be mounted at the right side of the device 100 and provide the appropriate spacing for the right stripping blade 136a. The spacer 137 defines a generally rectangular configuration and a mounting hole for mounting the spacer to the device 100. As in the centering structure 138, indicia 170 may be provided on the front face 180 for proper orientation of the spacer. In one embodiment, the spacer 137 has a thickness $T_S$ of about 0.012 inches extending from the front face 180 to the rear face 182 (see FIG. 10).

The centering structure 138, as noted above, provides for a rough alignment function for initial positioning of the fiber optic cable before stripping. As the stripping blades 136 come together, the fiber optic cable ends up at the circular end 160 of the groove 158 defined by the centering structure 138. At this location is provided the precise positioning of the fiber optic cable for the stripping blades 136 to strip the cable without damage to the fiber.

It should be noted that without departing from the inventive features of the centering structure 138, various different configurations of centering structures 138 for stripping various different types of fiber optic cables can be provided. For example, the centering structure 138 shown in FIGS. 4-7 is configured to align a 900 μm tight-buffer fiber optic cable. In such a cable, the buffer is bonded to the coating surrounding the optical fiber having a diameter of 125 μm. Including the buffer, the diameter of the tight-buffer fiber optic cable is generally about 900 μm. The immediate coating surrounding he fiber is 250 μm. When the centering structure 138 shown in FIGS. 4-7 is used with the stripping blades, the buffer and the coating can be stripped directly off the fiber at the same time leaving the 125 μm of exposed fiber.

It should be noted that, by slightly varying certain dimensions of the centering structure 138 of FIGS. 4-7, a centering structure that is used to strip a 900 μm loose-buffer fiber optic cable may be provided. In a loose-buffer fiber optic cable, as known in the art, an optical fiber surrounded by coating lies in a loose configuration within the buffer. In order to strip a loose-buffer fiber optic cable, the outer buffer (900 μm) is normally first removed with a separate micro-strip tool, as known in the art. Once the coating, which has a diameter of 250 μm and surrounds the fiber having a diameter of 125 μm, is exposed, the coating can be stripped off the fiber using a centering process similar to that described above for the tight-buffer fiber optic cable. For centering a loose-buffer 900 μm fiber optic cable, the diameter of the end of the elongate groove 158 of the plate 148 is decreased in order to obtain the desired centering for the stripping blades 136.

Table 1, below, lists example dimensions for an embodiment of the centering structure 138 illustrated in FIGS. 4-7. Referring to FIGS. 4-7, reference letter A is used to refer to the zero position in the vertical direction, where reference letter B is used to refer to the distance from the zero position in the vertical direction, where reference letter C is used to refer to the distance from the zero position in the vertical direction, and so forth.

Regarding the horizontal direction, the letter J denotes the zero position, where K is the distance from the zero position, L is the distance from the zero position, and so forth. Letter N denotes the distance from the zero position (denoted by letter J) going from left to right.

It should be noted that in the Table 1, below, reference letter S refers to the angle formed by the taper 164 at the open end 162 of the groove 158 adjacent the second end 152 of the plate 148. Letter T denotes the diameter of the circle formed at the closed end 160 of the groove 158. As mentioned above, for a 900 μm loose-buffer fiber optic cable, the configuration of the centering structure 138 in FIGS. 4-7 is varied only in that the width of the groove 158 and the diameter of the circle formed at the closed end 160 of the groove 158 are made smaller. In Table 1, below, letter T' denotes the diameter of the circle for a centering structure 138' used for a 900 μm loose-buffer fiber optic cable.

Letter V refers to the angle of the taper 168 of the top edge 166 of the plate 148 adjacent the second end 152 of the centering structure 138.

TABLE 1

Sample Dimensions in reference to FIGS. 4-7 for Centering Structures Used for 900 μm Tight and Loose Buffer Fiber Optic Cables (unless otherwise specified, all dimensions are in inches)

| | A | B | C | D | E | F | G | H | I | J | K |
|---|---|---|---|---|---|---|---|---|---|---|---|
| 900 μm Tight Buffer | 0.000 | 0.078 | 0.097 | 0.150 | 0.165 | 0.202 | 0.217 | 0.236 | 0.314 | 0.000 | 0.050 |

| | L | M | N | O | P | Q | R | S | T (dia.) | T' (dia.) | U | V |
|---|---|---|---|---|---|---|---|---|---|---|---|---|
| 900 μm Tight Buffer | 0.078 | 0.200 | 0.699 | 0.781 | 0.850 | 1.000 | 1.050 | 30° | 0.0356 (tight) | 0.0105 (loose) | 0.157 | 45° |

Table 2, below, lists example dimensions for an embodiment of the spacer illustrated in FIGS. 8-11 that is configured to be used with the centering structure 138 illustrated in FIGS. 4-7. As in Table 1, referring now to FIGS. 8-11, reference letter a is used to refer to the zero position in the vertical direction, where reference letter b is used to refer to the distance from the zero position in the vertical direction, where reference letter c is used to refer to the distance from the zero position in the vertical direction, and so forth.

Regarding the horizontal direction, the letter j denotes the zero position, where k is the distance from the zero position, l is the distance from the zero position, and so forth. It should be noted that regardless of whether 900 μm tight-buffer or 900 μm loose-buffer fiber optic cable is being stripped, the same spacer 137 shown in FIGS. 8-11 is utilized.

TABLE 2

Sample Dimensions in reference to FIGS. 8-11 for a Spacer Used for 900 μm
Tight and Loose Buffer Fiber Optic Cables (unless otherwise specified, all dimensions
are in inches)

| | a | b | c | d | e | f | g | h | i | j | k | l | m | n | o |
|---|---|---|---|---|---|---|---|---|---|---|---|---|---|---|---|
| 900 μm Tight or Loose Buffer | 0.000 | 0.078 | 0.097 | 0.150 | 0.165 | 0.202 | 0.217 | 0.236 | 0.314 | 0.000 | 0.490 | 0.571 | 0.748 | 0.782 | 0.830 |

FIGS. 12-23 illustrate an example pair of stripping blades 136 configured for use with the device 100 of FIG. 1, the pair of stripping blades 136 having features that are examples of inventive aspects in accordance with the principles of the present disclosure. FIGS. 12-15 illustrate the right and the left blades 136a, 136b, respectively, together as they would be positioned on the device 100. FIGS. 16-19 illustrate the right stripping blade 136a individually. FIGS. 20-23 illustrate the left blade 136b individually.

The stripping blades 136 may be used with the centering structure and spacer 137 shown in FIGS. 4-11 to provide for accurate stripping of the fiber optic cable buffer, without damaging the optical fiber within the coating and the buffer.

Referring to FIGS. 12-15, each of the right blade and the left blades 136 includes a plate 190 having a generally rectangular configuration. The stripping blades 136 are inserted into the attachment fixture 139 of the device before the centering structure 138 and the spacer 137, as shown in FIG. 3. As such, the centering structure 138 and the spacer 137 are positioned closer to the clamping mechanism 124 than the stripping blades 136.

Each of the stripping blades 136 defines a stripping end 192. The stripping ends 192 define generally a triangular configuration. At the tip of the triangle 194 is formed a semi-circular notch 196 that defines a stripping surface 198. When the right and the left blades 136a, 136b come together for the stripping operation, the semi-circular notches 196 form a stripping hole 200.

The stripping hole 200 lies flush with the front face 202 of the stripping blades 136. At the opposite, rear, face 204 of the stripping blades is a cavity 206 surrounding the hole 200. The blades 136 should be mounted on the device 100 such that the cavity 206 faces away from the clamping mechanism 124. As such, when the fiber optic cable is being stripped, the cavity 206 accommodates the collected buffer or coating being stripped. The cavity 206 defines a tapering surface 208, tapering down from the rear face 204 toward the front face 202 of the blade 136, all the way to the stripping hole 200.

Indicia 170 may be provided on the front face 202 of the stripping blades 136 to assist in proper insertion to the device 100. The blades 136 should be mounted such that the indicia 170 face away from the heating jaws 132 toward the clamping structure 124 of the device 100. In one embodiment, the right and the left stripping blades 136a, 136b each has a thickness $T_B$ of about 0.012 inches extending from the front face 202 to the rear face 204.

It should be noted that, as in the centering structure 138, without departing from the inventive features of the stripping blades 136, various different configurations of the stripping blades 136 for stripping various different types of fiber optic cables can be provided. For example, the pair of stripping blades 136 shown in FIGS. 12-23 is configured to strip a 900 μm tight-buffer fiber optic cable. As discussed above, in such a cable, the buffer is bonded to the coating (250 μm) surrounding the optical fiber (125 μm). Including the buffer, the diameter of the tight-buffer fiber optic cable is generally about 900 μm.

By slightly varying certain dimensions of the stripping blades (e.g., increasing or decreasing the diameter of the circular stripping hole 200), blades for stripping other types of fiber optic cables (e.g., 900 μm loose-buffer) may be provided.

Table 3, below, lists example dimensions for an embodiment of the right stripping blade 136a illustrated in FIGS. 16-19. Referring to FIGS. 16-19, reference numeral 1 is used to refer to the zero position in the vertical direction, where reference numeral 2 is used to refer to the distance from the zero position in the vertical direction, where reference numeral 3 is used to refer to the distance from the zero position in the vertical direction, and so forth.

Regarding the horizontal direction, reference numeral 13 denotes the zero position, where numeral 14 is the distance from the zero position, numeral 15 is the distance from the zero position, and so forth.

It should be noted that in the Table 3, below, reference numeral 19 refers to the diameter of the stripping hole 200 formed when the right and left blades 136a, 136b come together for stripping a 900 μm tight-buffer fiber optic cable. Reference numeral 20 refers to the diameter of the circular buffer cavity 206 formed around the stripping hole 200. As mentioned above, for a different fiber optic cable (e.g., a 900 μm loose-buffer fiber optic cable, where coating having a diameter of 250 μm and surrounding an optical fiber having a diameter of 125 μm is loose within a 900 μm buffer), the diameter of the stripping hole may be changed (e.g., decreased). In Table 3, below, numeral 19' denotes the diameter of the hole for a stripping blade used for a 900 μm loose-tube fiber optic cable.

In Table 3, below, reference numeral 21 refers to the angle the stripping end 192 surfaces make with the vertical (e.g., the angle formed by each of the legs of the slight triangle with respect to a vertical plane). Referring to FIG. 19 and Table 3, below, reference numeral 22 refers to the angle made by the taper of the buffer cavity 206 from the front face 202 toward the rear face 204.

TABLE 3

Sample Dimensions in reference to FIGS. 16-19 for Right Stripping Blade Used for 900 μm Tight and Loose Buffer Fiber Optic Cables (unless otherwise specified, all dimensions are in inches)

| | 1 | 2 | 3 | 4 | 5 | 6 | 7 | 8 | 9 | 10 | 11 |
|---|---|---|---|---|---|---|---|---|---|---|---|
| 900 μm Tight Buffer | 0.000 | 0.078 | 0.097 | 0.150 | 0.165 | 0.202 | 0.217 | 0.236 | 0.314 | 0.127 | 0.157 |

| | 12 | 13 | 14 | 15 | 16 | 17 | 18 | 19 (dia.) | 19' (dia.) | 20 (dia.) | 21 | 22 |
|---|---|---|---|---|---|---|---|---|---|---|---|---|
| 900 μm Tight Buffer | 0.183 | 0.000 | 0.708 | 0.790 | 0.925 | 0.985 | 1.023 | 0.0096 (tight) | 0.0079 (loose) | 0.032 | 5° | 14° |

Table 4, below, lists example dimensions for an embodiment of the left stripping blade 136b illustrated in FIGS. 20-23. As listed in Table 4, the left stripping blade 136b has the same configuration as the right stripping blade 136a and forms a mirror image of the right stripping blade 136a. Referring to FIGS. 20-23, reference numeral 23 is used to refer to the zero position in the vertical direction, where reference numeral 24 is used to refer to the distance from the zero position in the vertical direction, where reference numeral 25 is used to refer to the distance from the zero position in the vertical direction, and so forth.

Regarding the horizontal direction, reference numeral 35 denotes the zero position, where numeral 36 is the distance from the zero position, numeral 37 is the distance from the zero position, and so forth.

It should be noted that in the Table 4, below, reference numeral 41 refers to the diameter of the stripping hole 200 for a 900 μm tight-buffer fiber optic cable. Reference numeral 42 refers to the diameter of the circular buffer cavity 206 formed around the stripping hole 200. As mentioned above, for different fiber optic cable (e.g., a 900 μm loose-buffer fiber optic cable), the diameter of the stripping hole 200 may be changed (e.g., decreased). In Table 4, below, numeral 41' denotes the diameter of the hole for a stripping blade used for a 900 μm loose-buffer fiber optic cable.

In Table 4, below, reference numeral 43 refers to the angle the stripping end 192 surfaces makes with the vertical (e.g., the angle formed by each of the legs of the slight triangle with respect to a vertical plane). Referring to FIG. 23 and Table 4, below, reference numeral 44 refers to the angle made by the taper of the buffer cavity 206 from the front face 202 toward the rear face 204.

The above specification, examples and data provide a complete description of the manufacture and use of the inventive features of the disclosure. Since many embodiments of the disclosure can be made without departing from the spirit and scope of the disclosure, the inventive features reside in the claims hereinafter appended.

What is claimed is:

1. A fiber optic cable stripping device for stripping a fiber optic cable, the device comprising:

a pair of stripping blades including edges for stripping at least one layer surrounding an optical fiber, one of said blades placed at a right side and the other one of said blades placed at a left side of the device, the stripping blades configured to move toward each other in a horizontal direction to capture the layer to be stripped off of the optical fiber, a spacer including a generally rectangular body, the body of the spacer including a mounting hole for mounting the spacer to the device adjacent one of said two blades, a centering structure including a generally rectangular body with a first end and a second end spaced apart in a horizontal direction and a top end and a mounting hole for mounting the centering structure to the device adjacent the other one of said two blades and opposite said spacer, the top end including a downwardly angled portion adjacent said second end, the second end including a tongue protruding outwardly in an offset configuration with respect to a rest of the second end, wherein the tongue defines the endmost point of the second end, wherein the tongue defines a top contact surface extending substantially all the way to the endmost point of the second end for providing a vertical stop for the fiber

TABLE 4

Sample Dimensions in reference to FIGS. 20-23 for Left Stripping Blade Used for 900 μm Tight and Loose Buffer Fiber Optic Cables (unless otherwise specified, all dimensions are in inches)

| | 23 | 24 | 25 | 26 | 27 | 28 | 29 | 30 | 31 | 32 | 33 |
|---|---|---|---|---|---|---|---|---|---|---|---|
| 900 μm Tight Buffer | 0.000 | 0.078 | 0.097 | 0.150 | 0.165 | 0.202 | 0.217 | 0.236 | 0.314 | 0.127 | 0.157 |

| | 34 | 35 | 36 | 37 | 38 | 39 | 40 | 41 (dia.) | 41' (dia.) | 42 (dia.) | 43 | 44 |
|---|---|---|---|---|---|---|---|---|---|---|---|---|
| 900 μm Tight Buffer | 0.183 | 0.000 | 0.708 | 0.790 | 0.925 | 0.985 | 1.023 | 0.0096 (tight) | 0.0079 (loose) | 0.032 | 5° | 14° | optic cable laid on the top contact surface, the centering structure including an elongate groove formed at the second end of the body, the groove extending in a direction generally from the second end toward the first end, the groove including an open end facing toward the second end of the body and a closed end facing toward the first end of the body, at least a portion of the groove formed by the top contact surface of the tongue, wherein the groove defines a lower contact surface formed by the top contact surface of the tongue, the groove also defining an upper contact surface opposing the lower contact surface formed by the top contact surface of the tongue for vertically retaining the fiber optic cable within the groove, wherein the lower contact surface of the groove and the top contact surface of the tongue extending substantially all the way to the endmost point of the second end are vertically aligned;

wherein the centering structure is configured to position the fiber optic cable in a correct orientation both vertically and horizontally for stripping by the stripping blades of the fiber optic cable stripping device.

2. A fiber optic cable stripping device according to claim 1, wherein the closed end of the groove defines a generally semi-circular configuration having a total circle diameter of about 0.0356 inches.

3. A fiber optic cable stripping device according to claim 2, wherein the stripping device is configured to strip a tight-buffer fiber optic cable having a total buffer and optical fiber diameter of about 900 μm, wherein the optical fiber has a diameter of about 125 μm and includes a coating having a diameter of about 250 μm surrounding the optical fiber, wherein the buffer is bonded to the coating of the optical fiber.

4. A fiber optic cable stripping device according to claim 3, wherein the device is configured to pull the buffer of the fiber optic cable through a circular hole formed by the edges of the pair of stripping blades coming together, wherein each edge defines a generally semi-circular notch that forms the circular hole when the stripping blades come together, wherein the entire circular hole has a diameter of about 0.0096 inches.

5. A fiber optic cable stripping device according to claim 1, wherein the closed end of the groove defines a generally semi-circular configuration having a total circle diameter of about 0.0105 inches.

6. A fiber optic cable stripping device according to claim 5, wherein the stripping device is configured to strip a loose-buffer fiber optic cable including a total coating and optical fiber diameter of about 250 μm, wherein the optical fiber has a diameter of about 125 μm, wherein the coating surrounds the optical fiber.

7. A kit for use with a fiber optic cable stripping device, the kit comprising:
a pair of stripping blades, each including an edge with a generally semi-circular notch configured for stripping the fiber optic cable, each blade including a mounting hole for mounting the blades to the device at a left side and a right side of the device respectively,
a spacer including a generally rectangular body, the body of the spacer including a mounting hole for mounting the spacer to the device adjacent one of said two blades; and
a centering structure including a generally rectangular body with a first end and a second end spaced apart in a horizontal direction and a top end and a mounting hole for mounting the centering structure to the device adjacent the other one of said two blades and opposite said spacer, the top end including a downwardly angled portion adjacent said second end, the second end including a tongue protruding outwardly in an offset configuration with respect to a rest of the second end, wherein the tongue defines the endmost point of the second end, wherein the tongue defines a top contact surface extending substantially all the way to the endmost point of the second end for providing a vertical stop for the fiber optic cable laid on the top contact surface, the centering structure including an elongate groove formed at the second end of the body, the groove extending in a direction generally from the second end toward the first end, the groove including an open end facing toward the second end of the body and a closed end facing toward the first end of the body, at least a portion of the groove formed by the top contact surface of the tongue, wherein the groove defines a lower contact surface formed by the top contact surface of the tongue, the groove also defining an upper contact surface opposing the lower contact surface formed by the top contact surface of the tongue for vertically retaining the fiber optic cable within the groove, wherein the lower contact surface of the groove and the top contact surface of the tongue extending substantially all the way to the endmost point of the second end are vertically aligned, and wherein at least a portion of the upper contact surface of the groove is parallel to the lower contact surface formed by the top contact surface of the tongue.

8. A kit according to claim 7, wherein the kit is configured to be used for stripping a tight-buffer fiber optic cable having a total buffer and optical fiber diameter of about 900 μm, wherein the optical fiber has a diameter of about 125 μm and includes a coating having a diameter of about 250 μm surrounding the optical fiber,
wherein the buffer is bonded to the coating of the optical fiber, the closed end of the groove defining a generally semi-circular configuration having a total circle diameter of about 0.0356 inches and the stripping notch having a full circle diameter of about 0.0096 inches.

9. A method of stripping a fiber optic cable comprising:
providing a fiber optic cable having a layer immediately surrounding an optical fiber;
providing a fiber optic cable stripping device including a pair of stripping blades, each including an edge with a generally semi-circular notch configured for stripping the fiber optic cable, each blade including a mounting hole for mounting the blades to the device at a left side and a right side of the device respectively, the device further including a spacer having a generally rectangular body, the body of the spacer including a mounting hole for mounting the spacer to the device adjacent one of said two blades, the device further including a centering structure configured to position the fiber optic cable in a correct orientation both vertically and horizontally for stripping blades of the fiber optic cable stripping device as the stripping blades of the device come together in a horizontal direction to strip the layer surrounding the optical fiber, the centering structure further comprising a generally rectangular body with a first end and a second end spaced apart in a horizontal direction and a top end and a mounting hole for mounting the centering structure to the device adjacent the other one of said two blades and opposite said spacer, the top end including a downwardly angled portion adjacent said second end, the second end including a tongue protruding outwardly in an offset configuration with respect to a rest of the second end, wherein the tongue defines the endmost point of the second end, wherein the tongue defines a top contact surface extending substantially all the way to the endmost point of the second end for providing a vertical stop for the fiber optic cable laid on the top contact surface and an elongate groove formed at the second end of the body, the groove extending in a direction generally from the second end toward the first end, the groove including an open end facing toward the second end of the body and a closed end facing toward the first end of the body, at least a portion of the groove formed by the top contact surface of the tongue, wherein the groove defines a lower contact surface formed by the top contact surface of the tongue, the groove also defining an upper contact surface opposing the lower contact surface formed by the top contact surface of the tongue for vertically retaining the fiber optic cable within the groove, wherein the lower contact surface of the groove and the top contact surface of the tongue extending substantially all the way to the endmost point of the second end are vertically aligned;

laying the layer immediately surrounding the optical fiber on the top contact surface of the centering structure; and moving the layer surrounding the optical fiber toward the elongate groove by bringing the stripping blades of the fiber optic cable stripping device together in the horizontal direction and capturing the layer surrounding the optical fiber between the stripping blades.

* * * * *